United States Patent [19]
Garrett

[11] Patent Number: 5,607,499
[45] Date of Patent: Mar. 4, 1997

[54] PRESSURE SWING ADSORPTION PLANTS

[75] Inventor: Michael E. Garrett, Surrey, England

[73] Assignee: The BOC Group plc, Windlesham, England

[21] Appl. No.: 607,019

[22] Filed: Feb. 26, 1996

Related U.S. Application Data

[63] Continuation of Ser. No. 168,336, Dec. 17, 1993, abandoned, which is a continuation of Ser. No. 4,480, Jan. 12, 1993, abandoned, which is a continuation of Ser. No. 850,758, Mar. 13, 1992, abandoned.

[30] Foreign Application Priority Data

Mar. 16, 1991 [GB] United Kingdom .................. 9105619

[51] Int. Cl.$^6$ .................................................. B01D 53/047
[52] U.S. Cl. ............................. 96/108; 55/269; 96/126; 96/130
[58] Field of Search ............................. 96/112, 126–128, 96/130, 143–146, 108; 55/269

[56] References Cited

U.S. PATENT DOCUMENTS

| | | | |
|---|---|---|---|
| 3,734,293 | 5/1973 | Biskis | 96/126 X |
| 4,026,680 | 5/1977 | Collins | 96/126 X |
| 4,165,972 | 8/1979 | Iles et al. | 96/126 X |
| 4,218,224 | 8/1980 | Sun | 95/18 |
| 4,444,727 | 4/1984 | Yanagihara et al. | 96/126 X |
| 4,685,938 | 8/1987 | Oliker | 96/146 X |
| 4,698,073 | 10/1987 | Rohde et al. | 96/130 X |
| 4,816,043 | 3/1989 | Harrison | 96/112 |
| 4,941,894 | 7/1990 | Black | 96/112 X |

Primary Examiner—Robert Spitzer
Attorney, Agent, or Firm—Coleman R. Reap; Larry R. Cassett

[57] ABSTRACT

A pressure vessel 1 forming part of a PSA plant contains a molecular sieve adsorbent. A plurality of thermocouples are located within the molecular sieve adsorbent such that one junction 8 of each thermocouple is positioned adjacent the feed gas inlet 2 of the vessel 1 while the second junction 10 of each thermocouple is positioned adjacent the product gas outlet 4 of the vessel.

2 Claims, 3 Drawing Sheets

PRESSURE SWING ADSORPTION PLANTS

This is a continuation of application Ser. No 08/168,336 filed Dec. 17, 1993 (abandoned) a continuation of application Ser. No. 08/004,480, filed Jan. 12, 1993 (abandoned) a continuation of application Ser. No. 07/850,758 filed Mar. 13, 1992 (abandoned).

TECHNICAL FIELD

The present invention relates to the separation of a gas mixture by pressure swing adsorption (PSA) techniques.

BACKGROUND OF THE INVENTION

U.S. Pat. No. 4,026,680 addresses the problem of cold and hot spots or zones which are formed in the pressure vessels of PSA plants, particularly large scale PSA plants for the production of oxygen from feed air where the adsorbent material used is a zeolite molecular sieve.

U.S. Pat. No. 4,026,680 discloses that temperature drops in the order of 100° below feed air temperature have been observed at the inlet end of pressure vessels forming part of a PSA plant for the production of oxygen from feed air. Since the molecular sieve material is usually selected to operate best, as regards oxygen recovery efficiency, at ambient conditions, the effect of hot and cold spots is to reduce the performance of the molecular sieve material.

In order to meet this problem U.S. Pat. No. 4,026,680 teaches the transference of heat within the pressure vessel from the hot spot or zone to the cold spot or zone by metal solid conduction. The metal solid conduction can take the form of a plurality of metal plates positioned parallel and equi-distant from each other and extending through the adsorbent bed. An alternative embodiment teaches the use of metal rods.

Such methods form a passive control system in as much as a temperature difference has to exist within the pressure vessel before they can operate. That is to say, they reduce rather than eliminate the hot and cold spot effect. Although the temperature differences are very pronounced, in the order of minus 70° C. in the cold part of the pressure vessel and plus 40° C. in the warm part of the pressure vessel, the net heat flow is relatively small and the effect of metal solid conduction can take several days to become established.

SUMMARY OF THE INVENTION

It is an aim of the present invention to provide either passive or active means for inhibiting the effect of hot and cold spots in a pressure vessel of a PSA plant in order to maintain optimum performance of the adsorbent material used in the pressure vessel.

According to the present invention an apparatus for the separation of at least one constituent of a feed gas mixture by pressure swing adsorption comprises a pressure vessel containing a molecular sieve adsorbent, an inlet in said pressure vessel for said feed air, an outlet from said pressure vessel for product gas and is characterized by a plurality of thermocouples located within the molecular sieve adsorbent such that one junction of each thermocouple is positioned at or adjacent the inlet while the second junction of each thermocouple is positioned at or adjacent the outlet.

BRIEF DESCRIPTION OF THE DRAWINGS

Embodiments of the invention will now be described, by way of example, with reference to the accompanying diagrammatic drawings in which.

DETAILED DESCRIPTION OF THE INVENTION

Figure 1:
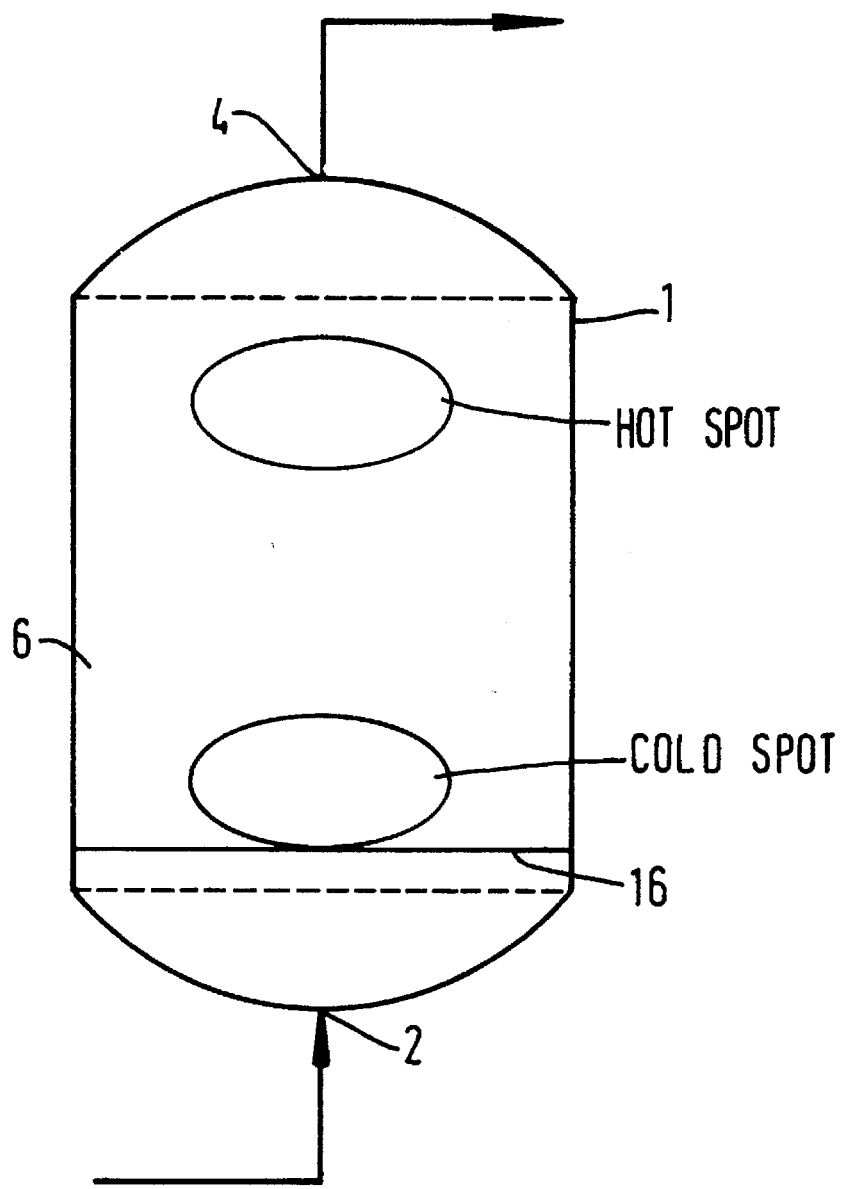
FIG. 1 is a schematic view of a pressure vessel forming part of a pressure swing adsorption plant for the production of oxygen enriched gas from air.

As shown in FIG. 1, a pressure vessel 1 forming part of a pressure swing adsorption plant for the production of an oxygen enriched gas from a feed air stream contains a bed 6 of adsorbent material in the form of a zeolite molecular sieve.

Adjacent an inlet 2 of the pressure vessel 1 is an alumina layer 16. As is known in the art, when the pressure vessel is in the adsorbing mode air under pressure passes from the inlet 2 through the alumina layer 16 and hence through the adsorbent bed 6 towards an outlet 4. The alumina layer 16 removes water vapor and possibly some carbon dioxide; and the adsorbent bed 6 preferentially adsorbs nitrogen and carbon dioxide such that an oxygen rich product gas exits from the pressure vessel 1 via the outlet 4.

During the desorption mode of the pressure vessel 1, the interior of the vessel 1 is exhausted, usually to a vacuum of between 200 and 500 torr, such that nitrogen rich gas is desorbed from the adsorbent bed 6 thus preparing the pressure vessel 1 for the next adsorption step.

As explained earlier, this continuous cycling of the adsorption bed 6, particularly in larger pressure vessels, in the order of 26 inches diameter, causes a cold spot or zone to be formed at or adjacent the inlet 2 while a relatively hot spot or zone is formed at or adjacent the outlet 4.

Figure 2:
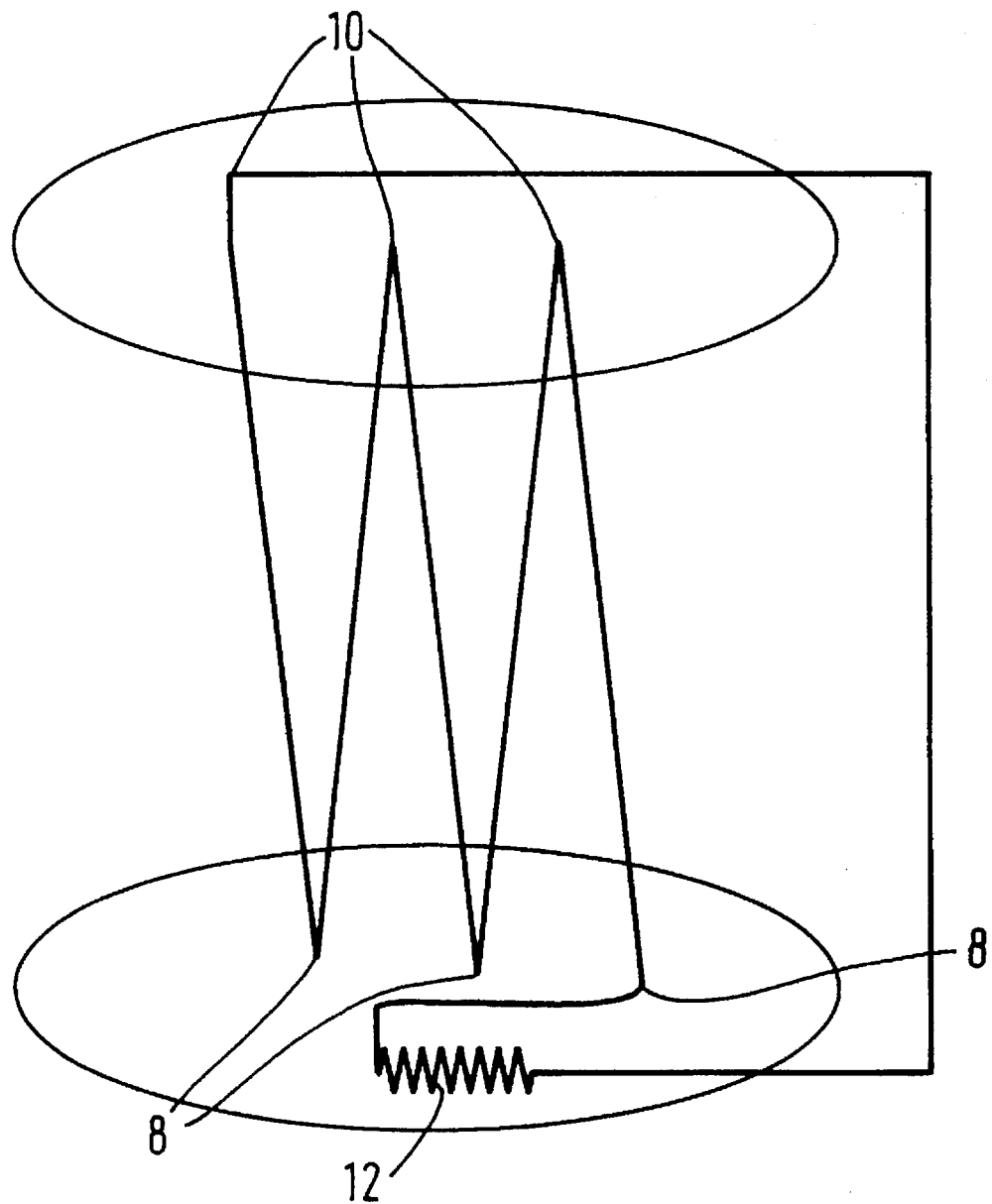
FIG. 2 is a diagrammatic sketch of thermocouples located within the pressure vessel of FIG. 1.

Referring now to FIG. 2, a plurality of thermocouples are located in the bed of adsorbent material 6 and arranged in series such that one set of junctions 8 is located in the cold zone while the other set of junctions 10 is located in the warm zone. A resistor 12 is positioned within the thermocouple circuit at or adjacent the inlet 2 of the pressure vessel 1. The electrical current generated by the differences in temperature between the hot zone and the cold zone and which flows through the resistor causes said resistor to heat up thereby heating up the cold zone and reducing the temperature difference between the hot zone and the cold zone.

Figure 3:
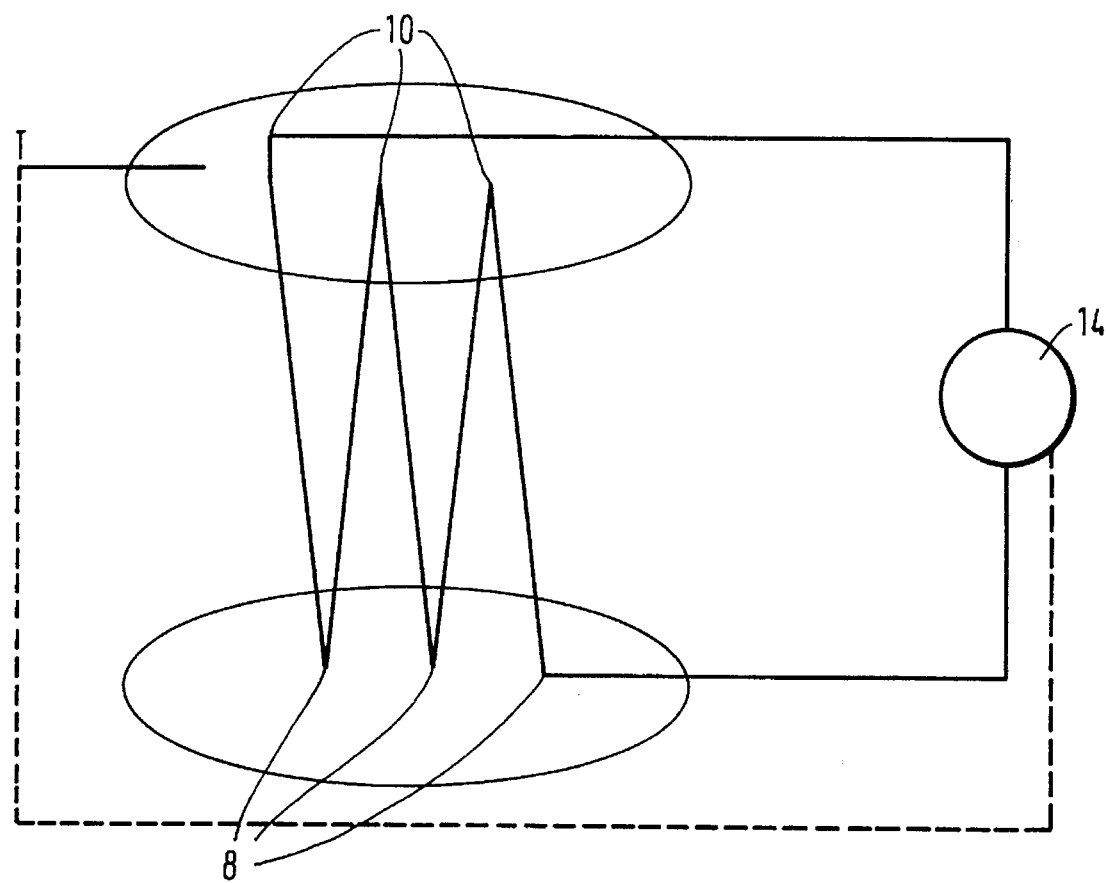
FIG. 3 is a diagrammatic sketch of a modification to the thermocouple circuit illustrated in FIG. 1.

Referring now to FIG. 3 where the thermocouple circuit is substantially the same as with FIG. 2 except that no resistor 12 is provided. A current is actively passed through the circuit from an external electrical power supply 14. This has the effect of causing one set of junctions to cool and the other set of junctions to warm and by arranging the junctions in the hot and cold zones external current can be adjusted to keep the temperature within the adsorbent bed 6 fully stabilized.

I claim:

1. An apparatus for the separation of at least one constituent of a feed gas mixture by pressure swing adsorption comprising a pressure vessel containing a molecular sieve adsorbent, an inlet for said feed gas, an outlet for product gas and a thermocouple circuit having a plurality of thermocouples located within the molecular sieve adsorbent such that one junction of each thermocouple is positioned at or adjacent the inlet while a second junction of each thermocouple is positioned at or adjacent the outlet of the pressure vessel and a source of electrical energy for passing a current of electricity through the thermocouple circuit to cause the junction at or adjacent the inlet to heat up and the junction at or adjacent the outlet to cool down, thereby simultaneously heating the bed in the vicinity of the first junction of each thermocouple and cooling the bed in the vicinity of the second junction of each thermocouple during a pressure swing adsorption cycle conducted in said pressure vessel.

2. An apparatus for the separation of at least one constituent of a feed gas mixture by pressure swing adsorption comprising a pressure vessel containing a molecular sieve adsorbent, an inlet for said feed gas, an outlet for product gas, a thermocouple circuit having a plurality of thermocouples located within the molecular sieve adsorbent such that one junction of each thermocouple is positioned at or adjacent the inlet while a second junction of each thermocouple is positioned at or adjacent the outlet of the pressure vessel, and a resistor positioned in said thermocouple circuit and lying within said molecular sieve adsorbent at or adjacent the inlet of the pressure vessel, said thermocouple circuit being adapted to generate a current of electricity by a difference in temperature between the junctions during a pressure swing adsorption cycle conducted in said pressure vessel, thereby causing said resistor to heat up in the absence of a current of electricity from an external source and thus heat the molecular sieve bed in the vicinity of said inlet.

* * * * *